United States Patent [19]
Britt

[11] 3,785,439
[45] Jan. 15, 1974

[54] TRACTOR CANOPY SPRINKLER SYSTEM

[76] Inventor: LeRoy A. Britt, P.O. Box 428, Pilot Rock, Oreg. 97868

[22] Filed: Feb. 9, 1972

[21] Appl. No.: 224,827

[52] U.S. Cl. .................................. 169/2 A, 169/24
[51] Int. Cl. .......................................... A62c 27/00
[58] Field of Search ..................... 169/2 A, 2 R, 24; 296/102; 280/5 A, 5 R

[56] References Cited
UNITED STATES PATENTS
2,975,797  3/1961  Matheney ...................... 280/5 A X
3,632,134  1/1972  Babbitt, Jr. et al. ............ 296/102 X
1,660,992  2/1928  Erwin ................................ 169/2 A FOREIGN PATENTS OR APPLICATIONS
201,881  2/1923  Great Britain ...................... 169/2 A Primary Examiner—M. Henson Wood, Jr.
Assistant Examiner—A. Kashnikow
Attorney—Stephen W. Blore et al.

[57] ABSTRACT

A tractor canopy includes one or more water receiving tanks connected by conduit means to a sprinkler system proximate the tractor engine. A pump withdraws water from the tanks for spraying the same toward the engine in the event of fire.

14 Claims, 5 Drawing Figures

PATENTED JAN 15 1974 3,785,439
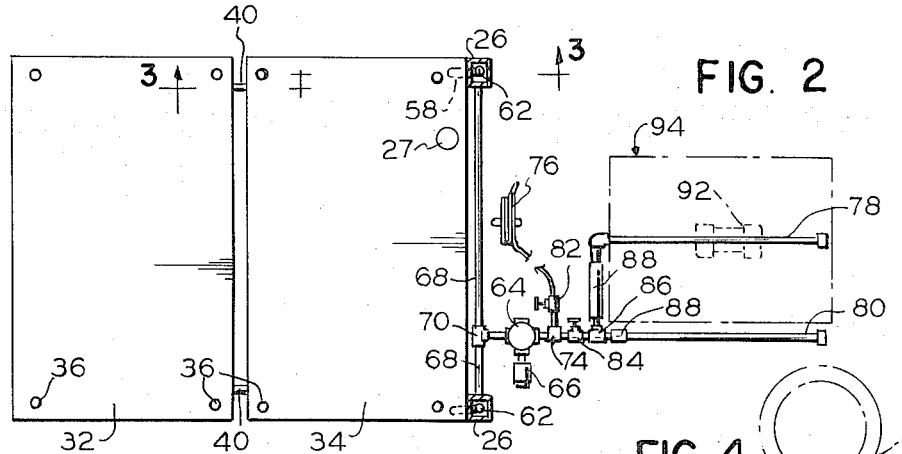
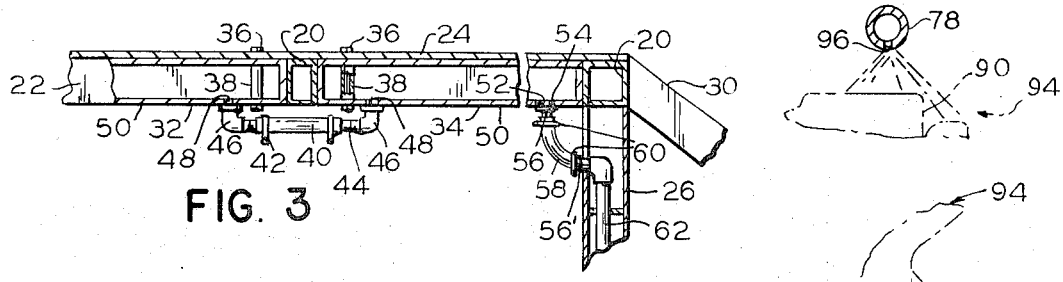
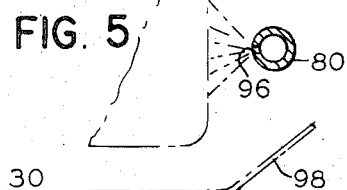
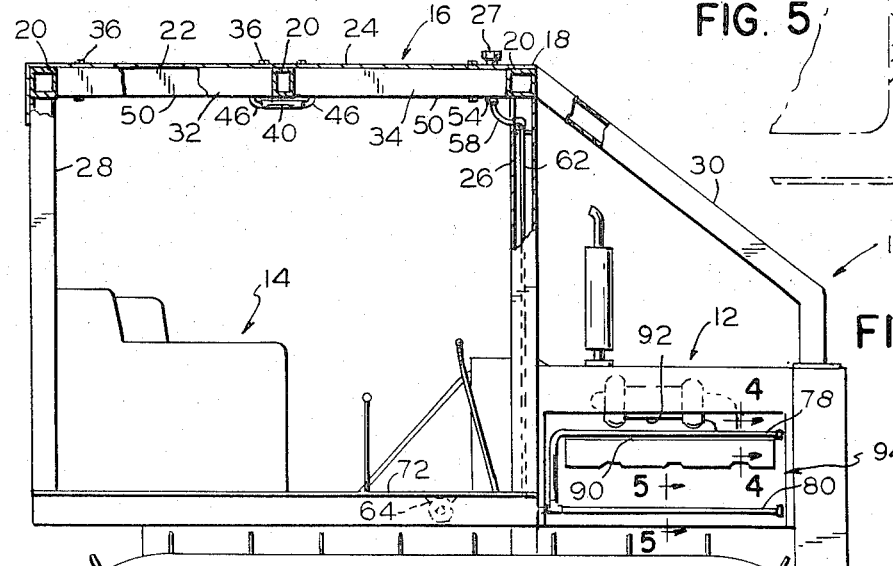
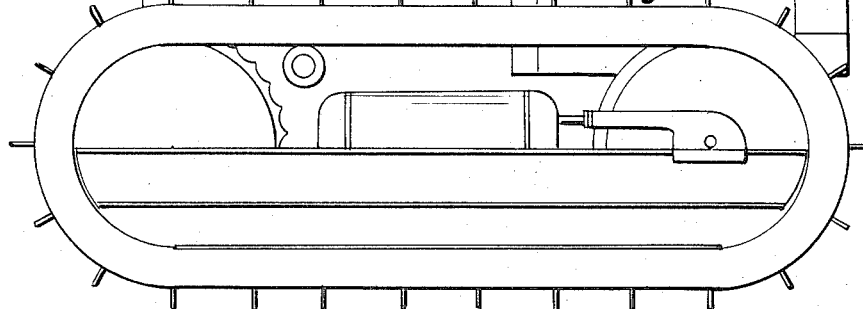

TRACTOR CANOPY SPRINKLER SYSTEM

BACKGROUND OF THE INVENTION

Crawler tractors employed in logging operations are apt to collect pine needles and other dry materials in and around the engine area. This dry material together with the engine oil which may collect in belly pans and the like is apt to present a fire hazard at the high engine temperatures normally encountered. If a fire starts, the tractor is frequently driven to a location where fire fighting equipment is available, such location being away from the logging area in order to minimize the danger of forest fires. In any case, before the tractor can be driven to where the fire fighting equipment is available, or before fire fighting equipment can be brought to the tractor location, the tractor engine is often ruined.

SUMMARY OF THE INVENTION

Crawler tractors for logging operations can be provided with an overhead canopy, such canopy normally being added to the tractor after the same is manufactured. This canopy protects the operator and the engine from falling debris such as brush, limbs, needles, and the like, and more importantly may serve as a roll bar should the tractor turn over due to heavy loading or precarious positioning. Despite the protective nature of the canopy, or other covers which may be employed, there appears no practical way to keep ignitable pine needles and the like away from the engine, exhaust manifold, and belly pan area of the usual crawler tractor.

According to the present invention, a tractor canopy is provided having an upper portion including one or more water receiving tanks communicating by conduit means downwardly toward the forward part of the tractor and the tractor engine. This conduit means communicates through valve means and pump means to one or more sprinkler tubes disposed adjacent the tractor engine. These sprinkler tubes are provided with a plurality of apertures or perforations, and in the event of fire, the pump is actuated manually or electrically for substantially immediately spraying the fire area with water or an appropriate fluid. The canopy water tanks can hold an appreciable quantity of water, e.g., 50 gallons per tank, and the fire can usually be extinguished immediately without the necessity of further fire fighting equipment. The location of the tanks in the canopy is convenient and effectively consumes no additional space, while actually providing additional protection for the tractor operator. Furthermore, the location of the tanks in an upraised position aids in the gravity flow of water to the engine area.

It is therefore an object of the present invention to provide improved fire fighting equipment for crawler tractors employed in logging operations.

It is a further object of the present invention to provide improved fire fighting equipment for tractors and the like which is capable of supplying an appreciable quantity of fluid, while being located in such a manner that it does not interfere with tractor operation nor require substantial space.

It is another object of the present invention to provide an improved protective canopy for crawler tractors and the like including built-in fire fighting equipment adapted to be installed on a tractor in a substantially unitary manner with said canopy.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side elevational view of a typical crawler tractor including a new built-in fire sprinkling system according to the present invention, FIG. 2 is a schematic or explanatory view of the above mentioned sprinkling system, FIG. 3 is a vertical sectional view taken on line 3—3 in FIG. 2, illustrating a tank interconnection and down spout connection, FIG. 4 is a vertical sectional view of an upper spray tube taken on line 4—4 of FIG. 1, and FIG. 5 is a vertical sectional view of a lower spray tube taken on line 5—5 of FIG. 1.

DESCRIPTION

In FIG. 1 of the drawings, a typical crawler tractor is indicated at 10, having an engine compartment 12, an operator's position 14, and additionally provided with a protective canopy 16 over the operator's position 14. Due to the nature of the work for which tractor 10 is generally employed, e.g. lumbering operations or the like, canopy 16 is desirably constructed of heavy walled tube that is either round in cross section or rectangular as indicated at 18. Not only does the canopy protect the operator from debris, but it operates as a roll bar should the tractor tip over. The canopy may vary in shape and size depending on the model of tractor upon which the same is mounted, but the canopy shown in FIG. 1 is of typical construction having an upper frame suitably including three, spaced, upper cross tubes 20 welded between side tubes 22 for tying the same together, and supporting a protective cover 24 suitably comprising a solid piece or sheet metal. The upper frame is supported by two tubular front legs 26 and two tubular rear legs 28 welded to the upper frame and in turn welded to the tractor frame. A pair of front struts 30 add structural stability to the canopy as well as providing a structural shield over the engine compartment 12.

Hollow water receiving tanks 32 and 34 are nested between the cross tubes 20 under the cover 24, each tank being capable of holding an appreciable quantity of water, e.g. 50 gallons. These tanks 32 and 34 are anchored in place to underside of cover 24 by bolts 36 which pass through sleeves 38 welded into tank, the tanks 32 and 34 being connected together by a flexible hose 40 on each side of the tractor. Each flexible hose 40 is connected by clamps 42 to pipe nipples 44 that are screwed into permanently attached pipe elbows 46 positioned over holes 48 in the tank bottom 50. The forward tank 34 is provided with two additional holes 52 into which pipe couplings 54 are welded. Pipe nipples 56 are screwed into couplings 54 and hoses 58 are attached to these nipples by clamps 60. The other end of each hose 58 is attached to a nipple 56' leading to a respective stand pipe 62 passing down through front corner post legs 26. Tank 34 is provided with a filler spout 27 extending through an aperture in cover 24.

A pump 64 driven by motor 66 is adapted to pump water from tank 34 through the stand pipes 62 as well as through cross over pipe 68 including tee 70. It will be noted that while the pipe connections are shown from tee 70 onward in extended schematic fashion in FIG. 2 for more clearly illustrating the function of the apparatus, the actual physical positioning of the pump 64 is preferably as indicated in FIG. 1, i.e. under the frame deck 72 of the tractor 10. Although a pump driven by a motor selectively empowered from the tractor's electrical system is preferred, a hand pump may alternatively be employed. The pump 64 discharges through tee 74 (FIG. 2) valve 84, tee 86, and flexible hoses 88 to fixed spray tubes 78 and 80, or alternatively to portable hose 76 through a valve 82. Valve 82 is opened and valve 84 is closed when the portable hose 76 is to be used. The portable hose can be mounted on a reel at the side of the tractor.

Normally the valve 82 is closed and valve 84 is opened as desired for spraying water directly into the engine compartment 12. The flow of sprinkling water normally is divided between two regions serviced respectively by tubes 78 and 80. The tube 78 passes over the valve cover 90 and under turbo-charger 92 of engine 94. Tube 78 is provided with small drilled holes or orifices 96 spaced quite close together and directed downward toward the engine cover and exhaust manifold area 90. Second tube 80 is positioned down along the side of the engine 94 under the starter and generator, so as to direct the spray from its holes 96 against the side of the engine while also providing liquid for extinguishing a fire that might start in belly pan 98. Tube 80 may suitably be positioned on the opposite side of the engine from tube 78. Orifices 96 may be provided with small nozzles if desired.

It will be seen that the placement of the water tanks at an elevated level in the roof portion of the canopy assists in the delivery of water toward the engine area. This water head may be employed if desired, according to the present invention, without the additional provision of a pump. However, of course, the pump assists in the delivery of the desired pressurized water spray toward the engine areas mentioned. When a fire breaks out in the engine area, valve 84, if it is not already turned on, is turned on, and pump 64 is started by operation of a dashboard switch (not shown) for starting motor 66. Water is then delivered under pressure to the aforementioned engine areas and, of course, collects in the belly pan. It is usually possible to extinquish a fire ignited by the exhaust manifold or the like in pine needles collecting around the engine before an extensive oil fire or engine fire starts. The hose 76 may also be employed in case the sprays from tubes 78 and 80 do not happen to strike the area where the fire is located, or in the instance where a small brush fire or the like has broken out at a location external to the tractor or external to the engine area of the tractor. For the latter purpose, valves 84 and 82 may be adjusted to divert part or all of the water delivered from pump 64 to the hose 76.

Although in the illustrated embodiment the tanks 32 and 34 are anchored by bolts 36 to the cover 24 ultimately supported by cross members and side members of the canopy upper frame, it is contemplated in accordance with the present invention that the tanks are alternatively welded into place between the aformentioned canopy cross members and side members so as to provide a substantially unitary structure. In such event, the tanks themselves form the roof of the tractor canopy and the additional cover 24 may or may not be included. In any case, the installation of the water tanks is desirably accomplished during manufacture of the canopy, and installation of the canopy on the commercially crawler tractor need not involve a separate installation of fire fighting equipment except insofar as the pump 64, the valves, the tubes 78 and 80, and connections are concerned. The tubes 78 and 80 may be supported by straps or connected to engine bolts or the like (not shown), in any convenient manner inasmuch as the tubes 78 and 80 are themselves desirably rigid, tending to be in part self-supporting.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a crawler type tractor,
   a protective canopy frame supported by the frame of said tractor and extending over the operator's position of said tractor, said protective canopy frame including upright members and a roof comprising an upper frame at an elevated roof level above the level of said operator's position, said upper frame including spaced structural members at said elevated roof level for joining said upright members and further including flat hollow water receiving tank means extending substantially between spaced structural members at said elevated roof level to form a major portion of said roof,
   conduit means extending downwardly from said water receiving tank, said conduit means including valve means for controlling the flow of water from said tank,
   and at least one sprinkler tube connected in communicating relation with said valve means and positioned substantially adjacent the engine of said tractor, said sprinkler tube being provided with a plurality of apertures for directing water toward said engine.

2. The apparatus according to claim 1 further including pump means connected with said conduit means for pumping water from said tank through said sprinkler tube.

3. The apparatus according to claim 1 wherein said structural members include cross members between said upright members, said tank means including a first flat tank received between a pair of said cross members,
   said tank means further including an additional flat tank received between cross members substantially in the same plane with said first tank,
   and fluid coupling means connecting said tanks.

4. The apparatus according to claim 1 wherein said sprinkler tube is disposed horizontally proximate the area of the exhaust manifold of said engine.

5. The apparatus according to claim 1 wherein said flat hollow water receiving tank means has a thickness at least comparable with the vertical thickness of said spaced structural members.

6. The apparatus according to claim 4 further including a second sprinkler tube in substantially parallel relation to the first sprinkler tube.

7. The apparatus according to claim 2 further including a flexible hose for mounting on said tractor and additional valve means for connecting said hose to said conduit means.

8. In combination,
a protective canopy for a tractor, said canopy comprising a vertical frame portion for securing to said tractor, and an upper or roof frame portion supported by the vertical frame portion and including spaced structural members, said canopy further including at least one hollow water tank of limited height disposed at a level substantially across said frame extending substantially between spaced structural members of said roof frame portion and forming a part of a roof portion of said canopy, and conduit means connected to said water tank for receiving a flow of water therefrom and adapted to provide a flow of water to the engine area of said tractor.

9. The apparatus according to claim 8 further including at least one sprinkler tube having a plurality of openings and disposed in spraying relation to the engine of the tractor,
and pump means for connecting said sprinkler tube to said conduit means.

10. A tractor canopy comprising:
a lower frame for attachment to said tractor,
an upper frame including upper frame members for protecting the operator's position of said tractor, said upper frame including side members and cross members,
and a hollow water receiving tank supported by said upper frame members, wherein said tank is substantially flat and disposed in level nested relation extending substantially between said side members and ones of said cross members, said water receiving tank being provided with conduit means for receiving a flow of water therefrom.

11. The apparatus according to claim 10 wherein said lower frame includes tubular upright members for supporting said upper frame, said conduit means being at least partially received within said one of said upright members for extending substantially between said upper frame and the tractor frame,
pump means connected to receive water from said conduit means,
at least one sprinkler tube for disposition along the tractor engine,
and valve means for connecting said pump means to said sprinkler tube.

12. The apparatus according to claim 11 including a second conduit means disposed at least partially within a second said tubular upright member, and crossover connection means for directing water from both said conduit means to said pump means at the lower end of said upright members.

13. The apparatus according to claim 9 further including a second substantially flat tank disposed in nested relation between said side members and cross members including one of the aforementioned cross members as well as an additional cross member,
and fluid coupling means between said tanks connected underneath said aforementioned one cross member,
said canopy also comprising a cover plate over said cross members and said tanks.

14. The apparatus according to claim 13 including one of said fluid coupling means on each side of said canopy.

* * * * *

UNITED STATES PATENT OFFICE
CERTIFICATE OF CORRECTION

Patent No. 3,785,439          Dated January 15, 1974

Inventor(s) Leroy A. Britt

It is certified that error appears in the above-identified patent and that said Letters Patent are hereby corrected as shown below:

Under "References Cited, United States Patents" add the following patents:

| | | | |
|---|---|---|---|
| --1,732,274 | 10/1929 | Livingston | 169/24 |
| 2,596,761 | 5/1952 | Carpani | 169/2.A |
| 2,841,228 | 7/1958 | Porterfield | 169/2.A |
| 2,867,281 | 1/1959 | Donehue | 169/2.A |
| 3,387,662 | 6/1968 | Molgano, Jr. | 169/2.A |
| 3,396,983 | 8/1968 | Massey et al. | 280/5.R |
| 3,488,061 | 1/1970 | Hansen et al. | 280/5.A-- |

Signed and sealed this 9th day of July 1974.

(SEAL)
Attest:

McCOY M. GIBSON, JR.
Attesting Officer

C. MARSHALL DANN
Commissioner of Patents